(12) United States Patent
Olansky et al.

(10) Patent No.: US 7,595,070 B2
(45) Date of Patent: Sep. 29, 2009

(54) METHOD FOR REMOVING CONTAMINANTS FROM ESSENTIAL OILS

(75) Inventors: Ad Sidney Olansky, Decatur, GA (US); Terence Radford, Atlanta, GA (US); Stephen G. Carlson, Altamonte Springs, FL (US); Esteban Arnoldo Bertera, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 377 days.

(21) Appl. No.: 11/421,091

(22) Filed: May 31, 2006

(65) Prior Publication Data

US 2006/0286134 A1    Dec. 21, 2006

Related U.S. Application Data

(60) Provisional application No. 60/692,695, filed on Jun. 21, 2005.

(51) Int. Cl.
*A23L 1/015* (2006.01)
(52) U.S. Cl. .................. 426/271; 426/478; 426/490; 426/651; 424/736
(58) Field of Classification Search .......... 426/271, 426/478, 490, 651; 424/736
See application file for complete search history.

(56) References Cited

U.S. PATENT DOCUMENTS

| | | | |
|---|---|---|---|
| 3,619,201 A | 11/1971 | Archer et al. | |
| 4,946,695 A | 8/1990 | Forster et al. | |
| 4,956,429 A | 9/1990 | Harmetz et al. | |
| 5,091,116 A | 2/1992 | Krishnamurthy et al. | |
| 5,093,123 A | 3/1992 | Schutz et al. | |
| 5,128,154 A | 7/1992 | Johnson et al. | |
| 5,155,245 A | 10/1992 | Myojo et al. | |
| 5,558,893 A | 9/1996 | Muraldihara et al. | |
| 5,880,300 A | 3/1999 | Kodali | |
| 5,906,848 A | 5/1999 | Kreuter et al. | |
| 6,024,998 A | 2/2000 | Kreuter et al. | |
| 6,033,706 A | 3/2000 | Silkeberg et al. | |
| 6,132,726 A | 10/2000 | Daughenbaugh et al. | |
| 6,376,689 B1 | 4/2002 | Muralidhara et al. | |
| 6,632,952 B1 | 10/2003 | Daniels | |

FOREIGN PATENT DOCUMENTS

CN    1158836    9/1997

(Continued)

OTHER PUBLICATIONS

Garland, Sandra M., Prof. Robert C. Menary, and Garth S. Oliver. "Determination of Pesticide Minimum Residue Limits in Essential Oils". Jun. 16, 2004. Rural Industries Research and Development Corporation, Australian Government.*

(Continued)

*Primary Examiner*—Walter D Griffin
*Assistant Examiner*—Renee Robinson
(74) *Attorney, Agent, or Firm*—Sutherland Asbill & Brennan LLP

(57) ABSTRACT

Method for removing a contaminant from an essential oil comprising contacting the essential oil including the contaminant with a strong acid cation exchange resin or a strong base anion exchange resin.

18 Claims, 1 Drawing Sheet

FOREIGN PATENT DOCUMENTS

| FR | 2220292 A1 | 10/1974 |
|---|---|---|
| JP | 36010475 | 7/1961 |
| JP | 2001049289 | 2/2001 |
| WO | 2004/082800 A1 | 9/2004 |
| WO | 2004082800 | 9/2004 |
| WO | 2007/001697 A1 | 1/2007 |

OTHER PUBLICATIONS

Saad, Bahruddin et al. "Determination of ortho-phenylphenol, diphenyl, and diphenylamine in apples and oranges using HPLC with fluorescence detection". Feb. 2004. Food Chemistry 84 (2004): 313-317.*

Title: "The Application of Ion-Exchange Resins to the Purification of Fats", Author: A. Oilero Gomez, et al., Abstract, Univ. Seville, Grasas y Aceites (Seville, Spain) 1958.

Title: "Miscella Refining of Oils and Fats", Author: Claude Defromont, et al., (1967), Abstract, Inst. Corps Gras, (Paris, France).

Title: "Refining of Waste Sunflower Seed Oil by Ion Exchange and Molecular Chromatography", Author: G. V. Frolova, et al., (1966), Abstract, Technol. Inst. of Meat and Dairy Ind., (Moscow).

Title: "Removal of Products of an Acid Nature from Spent Transformer Oil by Macroporous Ion Exchangers", Author: V. A. Vakulenko, et al., Abstract, (1975).

Title: "Use of Absorbents and Ion Exchangers for Purifying and Studying Mineral Oils", Author: Jan Hycnar, et al., Abstract, (1973).

Title: "Fish Oil Resin-Refining: Optimization of Fish Oil and Resin Volume Ratio", Author: Hari Eko Irianto, et al., pp. 69-81, (1993), Journal of Aquatic Food Product Technology, vol. 2 (1), The Haworth Press.

Title: "A Study on the Effect of Ion Exchangers on the Quality of Some Edible Oils", Egyptian Journal of Food Science vol. 4, No. 1-2; Author: H.A.Hasham, et al., (1978), pp. 9-14, (Cairo).

Title: "Chlorophyll Paper 2", Professor L.L. Diosady/Research, pp. 1-5, (Date publication was known to Applicants: Jun. 6, 2000), from WWW.chem-eng.toronto.edu/~diosady/rsc.html.

Title: "Will ion-Exchange Resins Remove Acid from Mineral Oils?", Machinery Lubrication Magazine, Author: Drew Troyer, et al., (2002), pp. 1-9, from http://www.machinerylubrication.com/article_detail.asp?articleid=419&relatedbookgroup=PowerGen.

Title: "Purification of Oils and Fats by Ion-Exchange Resin. VIII. Selective Extraction of Adsorbed Components by Methanol-Acid System," Author: Hiroshi Inoue, et al., (1962), Abstract, Ind. Res. Inst., (Hokkaido,Japan).

Title: "Purification of Oils and Fats by Ion-Exchange Resins X Some Components of Rice Bran Oil by Absorbed Ion-Exchange Resins," Author: Hirosi Inoue, et al., (1962), Abstract, Ind. Res. Inst. (Hokkaido, Japan).

Title: "Determination of Pesticide Minimum Residue Limits in Essential Oils" Author: Sandra M. Garland (2004), RIRDC Publication No. 04/104, (June).

Title: "Application of Ion-Exchange Cartridge Clean-Up In Food Analysis-I. Simultaneous Determination of Thiabendazole and Imazalil In Citrus Fruit and Banana Using High-Performance Liquid Chromatography With Ultraviolet Detection" Author: Ito Y, et al. (1998), Abstract, Journal of Chromatography A, Elsevier Amsterdam, NL, vol. 810 No. 1-2, (March).

Title: "Determination of Benomyl, Diphenyl, O-Phenylphenol, Thiabendazole, Chlorpyrifos, Methidathion, and Methyl Parathion In Oranges By Solid-Phase Extraction, Liquid Chromatography, and Gas Chromatography" Author: Yamazaki Y, et al. (1999), Journal of AOAC International, vol. 82, No. 6. Abstract, (November).

Braddock R. J., Goodrich R. M.: "Reduction of Limonene Chlorohydrins in Commercial Citrus Oils," Food Chemistry and Toxicology, vol. 70, No. 1, 2005, pp. 104-107, (January).

Disclosure Under 37 C.F.R. 1.56 dated Sep. 12, 2008, filed for U.S. Appl. No. 11/421,091.

International Search Report and Written Opinion for PCT/US2007/064479, (Sep. 18, 2006).

International Search Report and Written Opinion for PCT/US2006/020190, (Sep. 18, 2006).

Disclosure Under 37 C.F.R. 1.56 dated Jan. 20, 2009, filed for U.S. Appl. No. 11/421,091.

* cited by examiner

METHOD FOR REMOVING CONTAMINANTS FROM ESSENTIAL OILS

CROSS REFERENCE TO RELATED APPLICATIONS

This application claims priority under 35 USC § 119(e) to U.S. Provisional Patent Application 60/692,695, filed on Jun. 21, 2005, the disclosure of which is expressly incorporated herein by reference.

FIELD OF THE INVENTION

The present invention generally relates to flavorings and, more particularly, relates to essential oils and removal of contaminants therefrom.

BACKGROUND OF THE INVENTION

Essential oils are volatile oils derived from fruit peels and leaves, stems, flowers, bark, roots, or twigs of plants, and usually carry the odor or flavor of the plant or its fruit. Essential oils are useful as flavorings for foods and beverages, as perfumes, and for medicinal purposes. For example, essential oils include peel oils such as citrus oil. Citrus oils are derived from squeezing or pressing citrus fruit peel. Citrus oils can be derived from lemons, oranges, limes, grapefruits, tangerines, mandarins, bitter oranges, and bergamots. Other essential oils include, but are not limited to leaf oils such as mint oils, spice oils such as clove oil, and flower oils such as rose oil.

Plants and fruits from which essential oils are derived are widely cultivated, in part for the essential oils they produce. During cultivation, agricultural chemicals are often applied to the plant or fruit, or both, to control pests such as insects, fungus, and weeds. While much of the agricultural chemicals applied during cultivation are removed by washing the harvest, some agricultural chemical residue sometimes remains on the plant or fruit from which essential oils are derived and can be extracted along with the essential oils. Furthermore, agricultural chemicals such as fungicides may be applied to harvested fruit to prevent spoilage and this fruit may be subsequently processed to produce essential oil. Thus, essential oils can sometimes contain trace amounts of agricultural chemicals which are referred to herein as agricultural residue.

It is therefore desirable to remove agricultural chemical residue from essential oils and there remains a need for an effective and economical method of removing such contaminants from essential oils.

SUMMARY OF THE INVENTION

This invention addresses the foregoing need by providing a method for removing a contaminant from an essential oil comprising contacting the essential oil including the contaminant with either a strong acid cation exchange resin or a strong base anion exchange resin (referred to herein collectively as "a strong ion exchange resin") as appropriate. The strong ion exchange resin removes the contaminant from the essential oil by adsorption or ion exchange or both. Desirably, the strong ion exchange resin removes the contaminant from the essential oil without substantially diminishing the organoleptic properties of the essential oil.

Other objects, features, and advantages of this invention will become apparent from the following description, drawing, and claims.

DETAILED DESCRIPTION OF EMBODIMENTS

Figure 1:
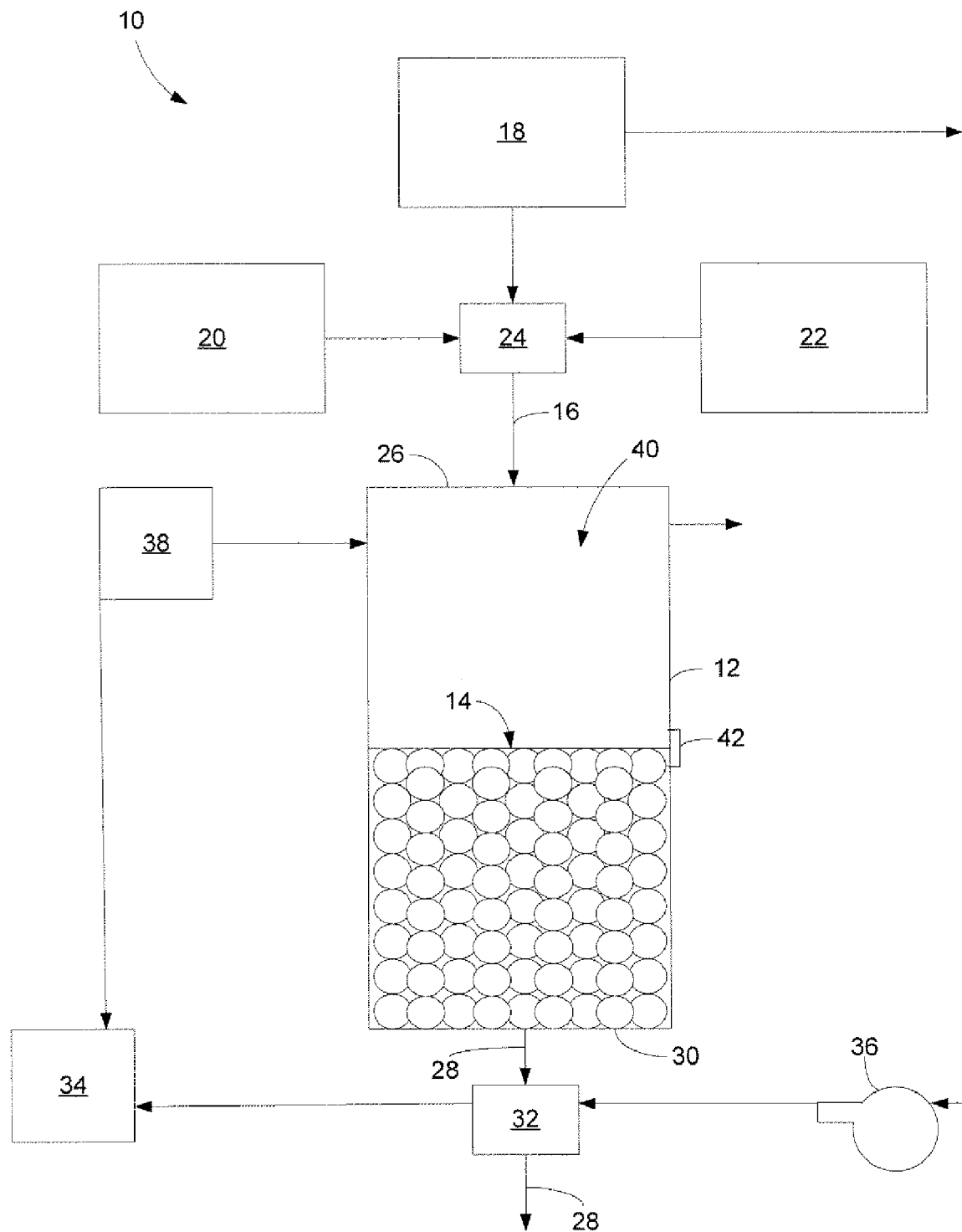
FIG. 1 is a schematic illustration of a system for the removal of a contaminant from essential oil in accordance with an embodiment of this invention.

As summarized above, this invention encompasses a method for removing contaminants from essential oils comprising contacting the essential oil including the contaminant with a strong ion exchange resin. The ion exchange resin desirably removes the contaminant without diminishing the organoleptic properties of the essential oil. Thus, the treated essential oil retains its desirable flavor or aroma, or both, but is more pure.

Essential oils treatable in accordance to the embodiments of this invention include all essential oils. Essential oils are volatile oils derived from fruit peels and leaves, stems, flowers, bark, roots, or twigs of plants, and usually carry the odor and/or flavor of the fruit or plant. Types of essential oils treatable in accordance with embodiments of this invention include, but are not limited to peel oils such as citrus oils, leaf oils such as mint oils, spice oils such as clove oil, flower oils such as rose oil, and other plant oil such as oil from stems, bark, roots and twigs. Citrus oils suitable for treatment in accordance with the embodiments of this invention include lemon oil, orange oil, lime oil, grapefruit oil, tangerine oil, mandarin oil, bitter orange oil, and bergamot oil. Embodiments of this invention are particularly effective in removing contaminants from citrus oils, but are also suitable for removing contaminants from any essential oil.

Embodiments of this invention are suitable for removing any essential oil contaminants that are removed by strong ion exchange resins. Examples of contaminants that are desirably removed from essential oils in accordance with embodiments of this invention include but are not limited to pesticides such as insecticides, fungicides, and herbicides. Some contaminants are acidic in nature and some are basic. Examples of acidic pesticides removable in accordance with the embodiments of this invention include, but are not limited to OPP (ortho-phenyl phenol) and 2,4-D (2,4-dichlorophenoxy acetic acid). Basic pesticides removable in accordance with embodiments of this invention include, but are not limited to imazalil, prochloraz, thiabendazole, carbaryl, carbendazim, diazinon, chlorpyrifos, metalaxyl, and methidathion. The foregoing are merely examples of contaminants removable in accordance with embodiments of this invention, but embodiments of this invention are suitable to remove many other contaminants as well.

Suitable strong ion exchange resins, in accordance with embodiments of this invention, remove contaminants from essential oils while leaving the organoleptic properties of the essential oil alone. Strong ion exchange resins are well known and are commonly used to treat aqueous liquids. Essential oils, however, are non-aqueous and the strong ion exchange resin functions to remove contaminants from a non-aqueous system such as essential oils. Strong base anion exchange resins are suitable for removing acidic contaminants from essential oils and strong acid cation exchange resins are suitable for removing basic contaminants from essential oils.

Many suitable strong base anion exchange resins and strong acid cation exchange resins are commercially available. Suitable commercially available strong base anion exchange resins include the Rohm & Haas Amberlite® resins which are primarily macroreticular cross-linked polystyrene resins. A particularly suitable commercially available food grade strong base anion exchange resin is Rohm & Haas Amberlite® FPA91CL, which is effective when converted to hydroxide form to remove OPP and other acidic pesticides from citrus oils. Suitable strong acid cation exchange resins for removing basic contaminants such as basic pesticides include, but are not limited to Rohm & Haas Amberlite® FPC22H resin, which is a sulfonated divinyl benzene styrene copolymer. Other suitable strong ion exchange resins suitable for use in embodiments of this invention include Dowex® ion exchange resins available from Dow Chemical Company, Serdolit® ion exchange resins available from Serva Electrophoresis GmbH, T42 strong acidic cation exchange resin and A23 strong base an ion exchange resin available from Qualichem, Inc., and Lewatit strong ion exchange resins available from Lanxess. As would be known to those skilled in the art, other suitable strong ion exchange resins for use with embodiments of this invention are commercially available.

Essential oils are treated with strong ion exchange resins in accordance with conventional methods such as flowing the essential oil through a bed of the resin in a packed column. Generally, in accordance with an embodiment of this invention, a suitable adsorption/ion exchange column is loaded with a suitable strong ion exchange resin. If the ion exchange resin is not in the suitable form, i.e. hydroxide form for anion exchange resin or hydrogen form for cation exchange resin, for removing the desired contaminant from the essential oil, the ion exchange resin can be converted to the hydroxide or hydrogen form using a suitable base or acid, as is well known to those skilled in the art. After thoroughly rinsing the ion exchange resin in the column with deionized water, it is ready for treating the essential oil, which is desirably loaded into the column from the top of the column and allowed to flow downwardly through the column until it is drained from the bottom of the column and into a storage tank. Although the flow of water and essential oil through the ion exchange resin is downward in the embodiments described herein, it should be understood that the flow of water and essential oil can be directed upwardly or in other directions, but a downward flow is preferred. Desirably, the relative amounts of ion exchange resins and essential oil and the residence time of the essential oil in the ion exchange resin are such that the desired removal of contaminant is achieved. Preferably, the contaminant is substantially completely removed from the essential oil.

Turning to the FIG. 1, an essential oil treatment system 10 is illustrated and generally comprises a packed bed column 12 loaded with ion exchange resin 14. An inlet 16 feeds deionized water from a water supply 18, an acid or base from an acid/base supply 20, or an essential oil from essential oil tank 22 through a valve system 24 into the top 26 of the column 12 as desired. A column outlet 28 drains liquid through the bottom 30 of the column 12 through another valve system 32. The outlet 28 drains water or the acid or base solution through the valve system 32 to a drain (not shown) or drains treated essential oil through the valve system to a treated oil tank. A pump 36 connected to the water supply 18 feeds deionized water in reverse flow through the lower valve system 32 into the bottom 30 of the column 12 for backflushing the column. A nitrogen purge 38 is capable of filling the head space 40 at the top 26 of the column 12 with nitrogen when processing essential oil through the column. The nitrogen purge 38 is also useful for filling any head space in the treated oil tank 34 as well. A sight glass 42 positioned at or near the head space 40 is helpful in monitoring the level of liquid above the ion exchange resin bed.

In operation, the column 12 is loaded with a suitable strong ion exchange resin 14 and the column is filled with deionized water from the water supply 18 through the inlet valve system 24 at least up to the top of the resin. The sight glass 42 is used to monitor the level of the deionized water in the column 12. The column 12 is backflushed as necessary with the backflush pump 36 to remove any air bubbles from the resin.

If the ion exchange resin 14 is not in the suitable form, i.e. hydroxide form for anion exchange resin or hydrogen form for cation exchange resin, for removing the desired contaminant from the essential oil, the ion exchange resin is converted to the hydroxide or hydrogen form using a suitable base or acid, as is well known to those skilled in the art. The base or acid is fed into the column 12 from the acid/base supply 20 through the inlet valve system 24 while deionized water is drained from the bottom 30 of the column through the lower valve system 32 and to a drain. When the pH indicates that the acid or base is being drained, the acid or base is drained into an appropriate container such as a stainless steel container. After the resin is converted to the appropriate basic or acidic form, the ion exchange resin is thoroughly rinsed with deionized water from the water supply 18 as the water is drained through the lower valve system 32 and to a drain. After rinsing, the column 12 is ready for treating the essential oil. If necessary, the column 12 is again backflushed to eliminate any air bubbles from the resin. The essential oil is desirably loaded into the top 26 of the column from the essential oil tank 22 and allowed to flow downwardly through the column until it is drained from the bottom of the column and into the storage tank 34.

The present invention is further illustrated below in an example which is not to be construed in any way as imposing limitations upon the scope of the invention. On the contrary, it is to be clearly understood that resort may be had to various other embodiments, modifications, and equivalents thereof which, after reading the description therein, may suggest themselves to those skilled in the art without departing from the scope of the invention and the appended claims.

Example 1

An 8 foot adsorption column having an inside diameter of 6.4 inches, a cross sectional area of 0.22 square feet, and a total internal volume of 1.76 cubic feet is filled with deionized water to a level of 6 inches below the column sight glass bottom fitting. Next the column is charged in 15 to 20 pound aliquots with 58.5 pounds of Rohm & Haas Amberlite® FPA91CL food grade strong base anion exchange resin to a resin height of 6 feet and a resin volume of 1.32 cubic feet. After each aliquot addition, the level of deionized water in the column is readjusted to a level of 6 inches below the lower sight glass fitting. This is accomplished by draining water out from the column bottom. Deionized water is then added until the water runs clear through the bottom of the column and is free from floating resin particles. The level of deionized water in the column is then readjusted to 1 inch above the top of the resin bed. To convert the resin to the hydroxide form, a 5% sodium hydroxide solution is slowly fed through the top of the column as water is drained through the bottom of the column until the pH of the liquid exiting the bottom of the column rises to indicate that the sodium hydroxide solution is beginning to exit the bottom of the column. When the pH of the solution rises to 9, the discharge is collected in a stainless steel drum. Sodium hydroxide is fed into the column until 250 pounds of sodium hydroxide solution have been pumped into the column. The last of the sodium hydroxide solution is allowed to flow down through the column to a level at the bottom of the column sight glass. The sodium hydroxide flow is then stopped to insure that the resin bed remains wetted with solution. Deionized water is then added through the top of the column and flow through the bottom of the column is resumed. The sodium hydroxide solution is allowed to drain completely from the column and the column is then rinsed with deionized water until the pH of water exiting the column drops to 8 or below. The sodium hydroxide solution should be contacted with the resin bed for at least a period of 15 minutes during the conversion process. The resin is then in the hydroxide form and the column is ready for charging with essential oils such as grapefruit oil. The level of deionized water is brought down to the bottom of the column sight glass, but still covering the resin bed. It is important not to let the resin bed be exposed to column gases.

A 300 gallon portable tank is charged with 283 gallons of white grapefruit oil and the head space in the tank is flushed and maintained with nitrogen. The white grapefruit oil is then fed through the top of the column while water is drained from the bottom of the column and into a drain until the discharge from the column switches from water to oil. The grapefruit oil feed is drained from the bottom of the column into a storage container at a flow rate of about 5.3 pounds of grapefruit oil per minute. After the entire 283 gallons of white grapefruit oil is passed through the column and loaded into the storage container, the head space of the container is filled with nitrogen.

It should be understood that the foregoing relates to particular embodiments of the present invention and that numerous changes may be made therein without departing from the scope of the invention as defined by the following claims.

We claim:

1. Method for removing a contaminant from a citrus oil comprising contacting the citrus oil including the contaminant with a strong ion exchange resin such that at least a portion of the contaminant is retained by the strong ion exchange resin.

2. Method as in claim 1 wherein the citrus oil is selected from the group consisting of lemon oil, orange oil, lime oil, grapefruit oil, mandarin oil, bitter orange oil, and bergamot oil.

3. Method as in claim 1 wherein the contaminant is acidic and the strong ion exchange resin is a strong base anion exchange resin.

4. Method as in claim 1 wherein the contaminant is basic and the strong ion exchange resin is a strong acid cation exchange resin.

5. Method as in claim 1 wherein the contaminant is an agricultural residue.

6. Method as in claim 5 wherein the agricultural residue is a pesticide.

7. Method as in claim 3 wherein the contaminant is orthophenyl phenol.

8. Method as in claim 3 wherein the contaminant is 2,4-dichlorophenoxy acetic acid.

9. Method as in claim 4 wherein the contaminant is selected from the group consisting of imazalil, prochloraz, thiabendazole, carbaryl, carbendazim, diazinon, chlorpyrifos, metalaxyl, and methidathion.

10. Method as in claim 1 wherein the step of contacting the citrus oil with the strong ion exchange resin comprises passing the citrus oil through a bed of the strong ion exchange resin.

11. Method for removing a contaminant from a citrus oil comprising contacting the citrus oil including the contaminant with a strong ion exchange resin such that the strong ion exchange resin removes at least a portion of the contaminant without substantially diminishing the organoleptic properties of the citrus oil.

12. Method as in claim 11 wherein the strong ion exchange resin substantially entirely removes the contaminant from the citrus oil.

13. Method as in claim 11 wherein the citrus oil is selected from the group consisting of lemon oil, orange oil, lime oil, grapefruit oil, mandarin oil, bitter orange oil, and bergamot oil.

14. Method as in claim 11 wherein the contaminant is acidic and the strong ion exchange resin is a strong base anion exchange resin.

15. Method as in claim 11 wherein the contaminant is basic and the strong ion exchange resin is a strong acid cation exchange resin.

16. Method as in claim 11 wherein the contaminant is an agricultural residue.

17. Method as in claim 16 wherein the agricultural residue is a pesticide.

18. Method as in claim 11 wherein the step of contacting the citrus oil with the strong ion exchange resin comprises passing the citrus oil through a bed of the strong ion exchange resin.

* * * * *

UNITED STATES PATENT AND TRADEMARK OFFICE
CERTIFICATE OF CORRECTION

PATENT NO. : 7,595,070 B2 Page 1 of 1
APPLICATION NO. : 11/421091
DATED : September 29, 2009
INVENTOR(S) : Olansky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Twenty-eighth Day of September, 2010

David J. Kappos
*Director of the United States Patent and Trademark Office*